US008532337B2

(12) United States Patent
Chang et al.

(10) Patent No.: US 8,532,337 B2
(45) Date of Patent: Sep. 10, 2013

(54) OBJECT TRACKING METHOD (75) Inventors: Yin-Pin Chang, Hsinchu County (TW); Wen-Yan Chang, Miaoli County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 357 days.

(21) Appl. No.: 13/077,013

(22) Filed: Mar. 31, 2011

(65) Prior Publication Data

US 2012/0106783 A1 May 3, 2012

(30) Foreign Application Priority Data

Oct. 29, 2010 (CN) .................................. 99 1 37340

(51) Int. Cl.
*G06K 9/00* (2006.01)
(52) U.S. Cl.
USPC ........... 382/103; 382/106; 382/107; 382/162; 382/165; 382/168; 348/135; 348/136; 348/137; 348/169; 348/170
(58) Field of Classification Search
None
See application file for complete search history.

(56) References Cited

U.S. PATENT DOCUMENTS

| | | | | |
|---|---|---|---|---|
| 5,631,697 A * | 5/1997 | Nishimura et al. | ........... | 348/172 |
| 5,812,193 A * | 9/1998 | Tomitaka et al. | ............. | 348/369 |
| 6,088,060 A * | 7/2000 | Suda et al. | ..................... | 348/350 |
| 6,130,964 A * | 10/2000 | Marques et al. | .............. | 382/236 |
| 6,226,388 B1 * | 5/2001 | Qian et al. | .................... | 382/103 |
| 6,937,744 B1 * | 8/2005 | Toyama | ........................ | 382/103 |
| 2003/0086496 A1 * | 5/2003 | Zhang et al. | ............. | 375/240.16 |
| 2004/0004670 A1 * | 1/2004 | Yamashita | ..................... | 348/345 |
| 2005/0031325 A1 * | 2/2005 | Fujii | ................................ | 396/54 |
| 2005/0270410 A1 * | 12/2005 | Takayama | ..................... | 348/345 |
| 2009/0027502 A1 * | 1/2009 | Yang | ............................. | 348/169 |
| 2010/0045800 A1 * | 2/2010 | Chebil et al. | .................. | 348/169 |
| 2010/0134632 A1 * | 6/2010 | Won et al. | ..................... | 348/169 |

OTHER PUBLICATIONS

Zhuang et al. "Target tracking in colored image sequence using weighted color histogram based particle filter." Dec. 17-20, 2006, ROBIO'06, IEEE, 1488-1493.*

* cited by examiner

*Primary Examiner* — Matthew Bella
*Assistant Examiner* — Jason Heidemann
(74) *Attorney, Agent, or Firm* — Morris Manning & Martin LLP; Tim Tingkang Xia, Esq.

(57) ABSTRACT

An object tracking method includes steps of obtaining multiple first classifications of pixels within a first focus frame in a first frame picture, wherein the first focus frame includes an object to be tracked and has a first rectangular frame in a second frame picture; performing a positioning process to obtain a second rectangular frame; and obtaining color features of pixels around the second rectangular frame sequentially and establishing multiple second classifications according to the color feature. The established second classifications are compared with the first classifications sequentially to obtain an approximation value, compared with a predetermined threshold. The second rectangular frame is progressively adjusted, so as to establish a second focus frame. By analyzing color features of the pixels of the object and with a classification manner, the efficacy of detecting a shape and size of the object so as to update information of the focus frame is achieved.

3 Claims, 10 Drawing Sheets

| 1 | 1 | 1 | 1 | 0.9 | 0.9 | 0.9 | 0.8 | 0.8 | 0.8 | 0.7 | 0.7 | 0.7 | 0.7 | 0.6 | 0.6 | 0.6 | 0.6 | 0.5 | 0.4 | 0.4 | 0.3 | 0.3 |

OBJECT TRACKING METHOD

CROSS-REFERENCE TO RELATED APPLICATIONS

This non-provisional application claims priority under 35 U.S.C. §119(a) on Patent Application No. 099137340 filed in Taiwan, R.O.C. on Oct. 29, 2010, the entire contents of which are hereby incorporated by reference.

BACKGROUND OF THE INVENTION

1. Field of the Invention

The present invention relates to an object tracking method, and more particularly to an object tracking method that is applied to a digital camera and can quickly and dynamically adjust a size of a focus frame of the digital camera.

2. Related Art

Generally, in digital cameras having an object tracking function currently available in the market, except for human face detection, most digital cameras perform tracking with a focus frame in a fixed size, and the size of the focus frame does not change with variation of the object, so the state of the variation of the object size cannot be effectively displayed. For example, when the object goes far away a lens, the object size becomes smaller, while the focus frame in the fixed size contains many images which are not the object to be tracked, which reduces the fineness of the focus frame.

Currently, the human face detection is applied to the digital camera, and the size of the focus frame varies with the size of the human face. However, this action of recording a known human face feature through machine learning, and then performing focusing is only applicable to human face tracking and detection, and the human face detection technology cannot be applied to tracking any object.

Additionally, for a dynamic object in a moving procedure, if no specific method is used to detect the variation of the object size, and tracking is only performed through a simple fixed focus frame, the tracking fails very easily due to change of the object size or shape.

Therefore, how to more effectively establish a focus frame through a method or means so as to enable the digital camera not only to effectively track and position any object in successive pictures, but also to update information of the focus frame according to the object shape and size is a goal relevant research and development manufacturers are striving for.

SUMMARY OF THE INVENTION

In order to improve an object tracking technology and enable a digital camera or other image capture devices to perform object tracking and positioning more quickly and effectively, in the present invention, with a color analyzing technology, by analyzing weight values of pixels covered by an object and in combination with performing a regional classification method, a shape and a size of the object are detected, so as to update information of a focus frame according to the shape and the size of the object.

According to an object tracking method of the present invention, firstly, a classification process is performed in a first frame picture, so as to obtain multiple first classifications of pixels within a first focus frame. The first focus frame comprises an object to be tracked and has a first rectangular frame. Then, a positioning process is performed according to the first rectangular frame in a second frame picture, so as to obtain a second rectangular frame, and a color feature of each of the pixels around the second rectangular frame is obtained sequentially, and multiple second classifications are established according to the color features. The established second classifications are compared with the corresponding first classifications sequentially by an approximation, so as to obtain approximation values, and then the approximation values are compared with a predetermined threshold.

When the approximations are higher than the threshold, the second rectangular frame is progressively adjusted to a pixel range covered by the second classifications. When the approximations are lower than the threshold, adjusting the second rectangular frame is stopped, so as to establish a second focus frame.

In view of the above, according to the present invention, by using color detection, firstly, color features of pixels within a focus frame are utilized to perform positioning in successive pictures, so as to track a displacement extent of an object, and regional classification is performed with weight values of pixels covered by the object to detect a shape and a size of the object, so as to update information of the focus frame. In this way, adjusting the size of the focus frame in a dynamic manner can be helpful to a subsequent operation of focusing.

Therefore, different from tracking an object with a fixed focus frame previously which easily fails due to the change of a size or a shape of an object, in the present invention, object detection and tracking are performed by utilizing information of partial weight values through classification, so as to quickly change the size of the focus frame to achieve a more stable object tracking efficacy.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 3A:
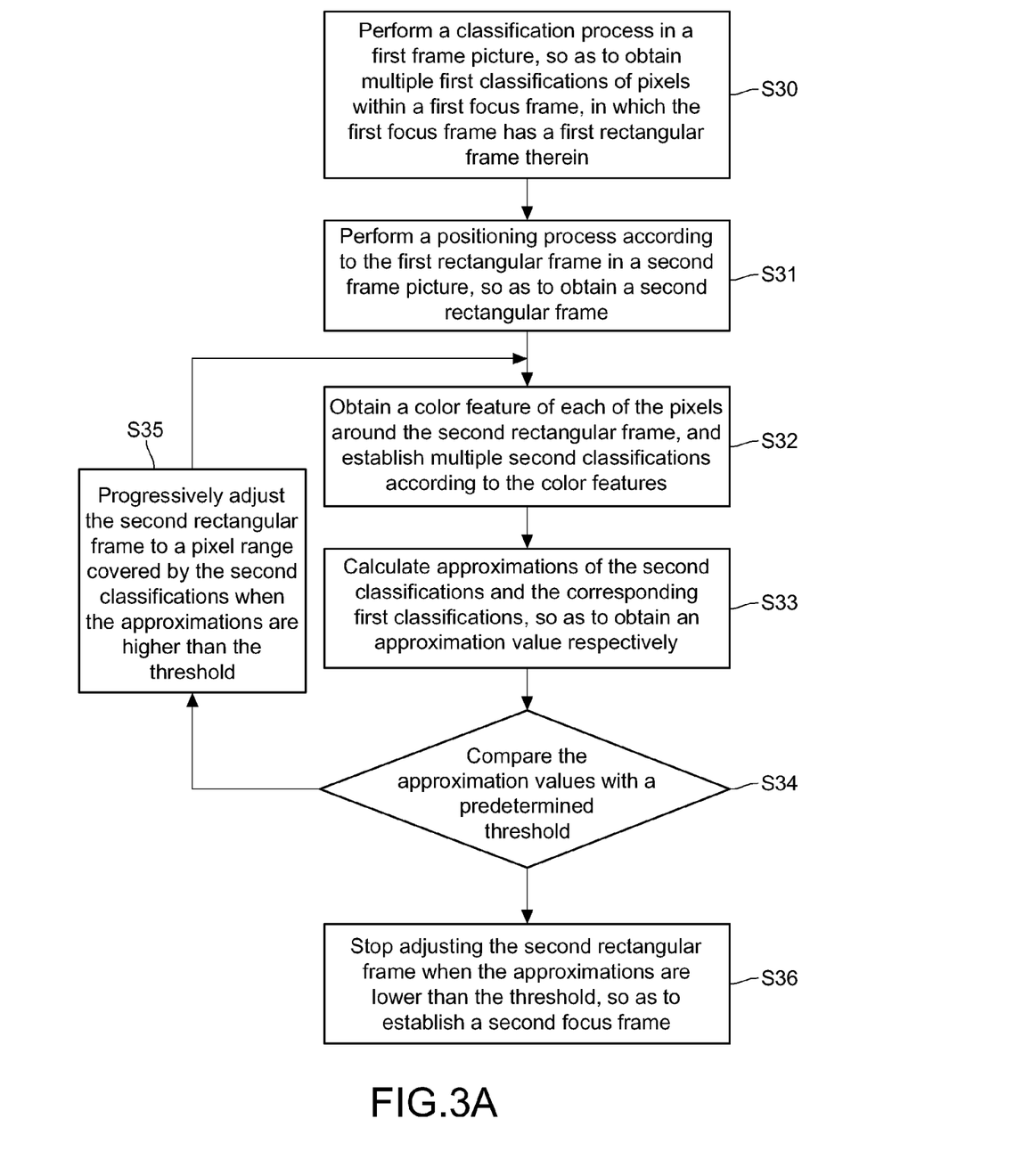
FIG. 3A is a flow chart of the object tracking method according to the present invention.

Referring to FIG. 3A, FIG. 3A is a flow chart of the object tracking method according to the present invention. The present invention can be applied to an image capture device (such as a digital camera or a video camera), and an object tracking method thereof comprises the following steps.

In Step S30, a classification process is performed in a first frame picture, so as to obtain multiple first classifications of pixels within a first focus frame. The first focus frame has a first rectangular frame therein.

In Step S31, a positioning process is performed according to the first rectangular frame in a second frame picture, so as to obtain a second rectangular frame.

In Step S32, a color feature of each of the pixels around the second rectangular frame is obtained sequentially, and multiple second classifications are established according to the color features.

In Step S33, approximations of the second classifications and the corresponding first classifications are calculated sequentially, so as to obtain an approximation value respectively.

In Step S34, the approximation values are compared with a predetermined threshold sequentially.

In Step S35, when the approximations are higher than the threshold, the second rectangular frame is progressively adjusted to a pixel range covered by the second classifications.

In Step S36, when the approximations are lower than the threshold, adjusting the second rectangular frame is stopped, so as to establish a second focus frame.

Figure 3B:
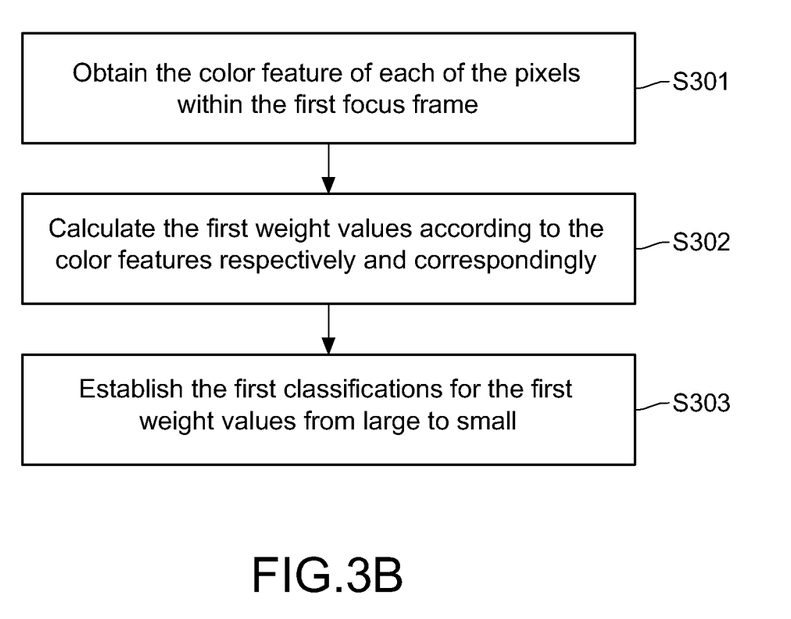
FIG. 3B is a flow chart of a classification process according to the present invention.
Figure 3C:
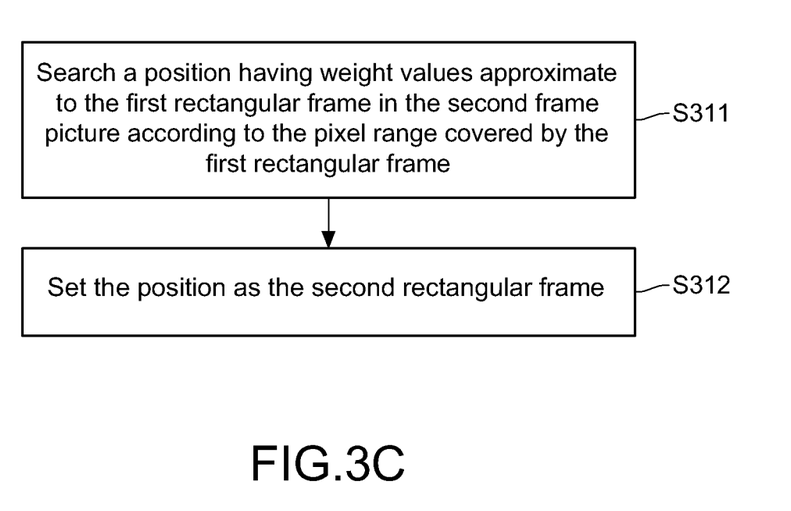
FIG. 3C is a flow chart of a positioning process according to the present invention.

Referring to FIG. 3C cooperatively, FIG. 3B is a flow chart of a classification process according to the present invention. The classification process of the present invention comprises the following steps.

In Step S301, the color feature of each of the pixels within the first focus frame is obtained.

In Step S302, the first weight values are calculated according to the color features respectively and correspondingly.

In Step S303, the first classifications are established for the first weight values from large to small.

Referring to FIG. 3C cooperatively, FIG. 3C is a flow chart of a positioning process according to the present invention. The positioning process comprises the following steps.

In Step S311, a position having weight values approximate to the first rectangular frame is searched in the second frame picture according to the pixel range covered by the first rectangular frame.

In Step S312, the position is set as the second rectangular frame.

The pixel weight value and the method for searching the approximate weight value can be obtained by describing space configuration of colors in an image and constructing a color histogram with a color layout descriptor within a color space. This technology is known by persons skilled in the art, and thus is not recited herein.

According to Step S33, after the second classifications are established in the present invention, approximations of the second classifications and the corresponding first classifications are calculated sequentially, so as to obtain an approximation value respectively. This calculation of the approximation values can be made by measuring a Euclidean distance between feature vectors of the weight values, and smaller acquired value indicates higher approximation of two images. However, this is also known by persons ordinarily skilled in the art, and is not recited herein.

According to Step S34, the approximation value is compared with a predetermined threshold sequentially. The threshold refers to an approximation value the object tracking is capable of tolerating. For example, if the highest approximation is defined as "10", the lowest approximation is defined as "0", and the threshold is set as "5", that is, only a pixel range above a result of an approximation value of "5" can be accepted as 'similar', and is a range of the second focus frame, and the rest is excluded.

Figure 1A:
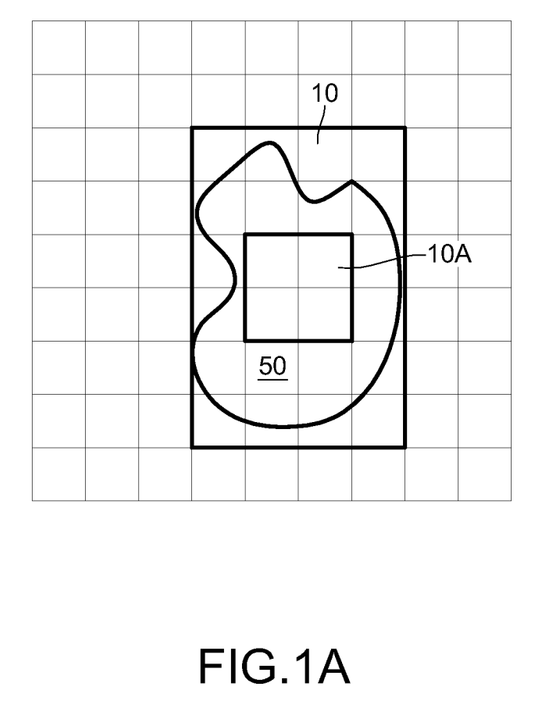
FIG. 1A is a schematic view of Step S30 of an object tracking method according to the present invention.
Figure 1B:
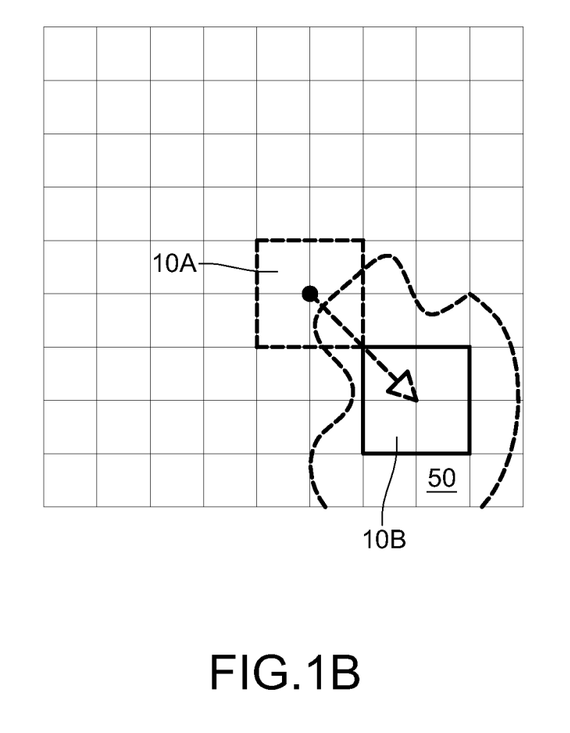
FIG. 1B is a schematic view of Step S31 of the object tracking method according to the present invention.
Figure 1C:
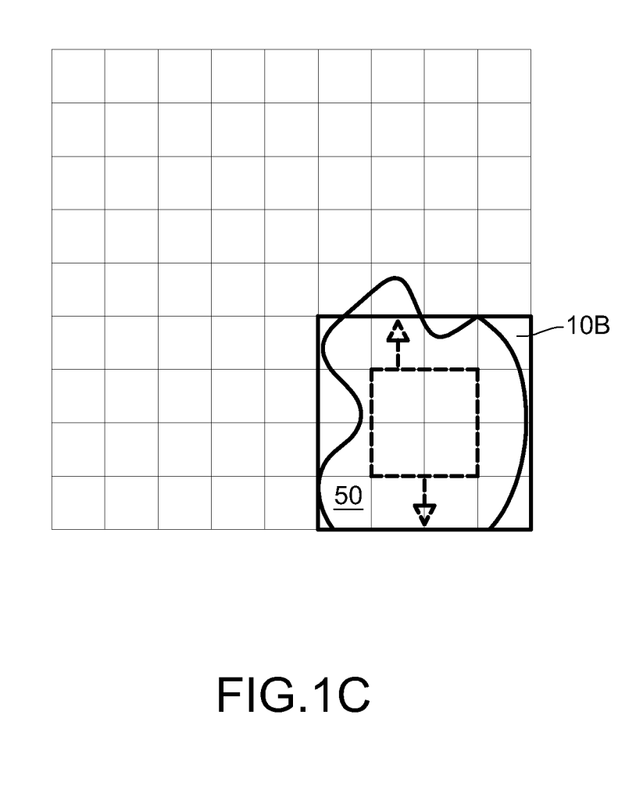
FIG. 1C is a schematic view of Steps S32 to S35 of the object tracking method according to the present invention.
Figure 1D:
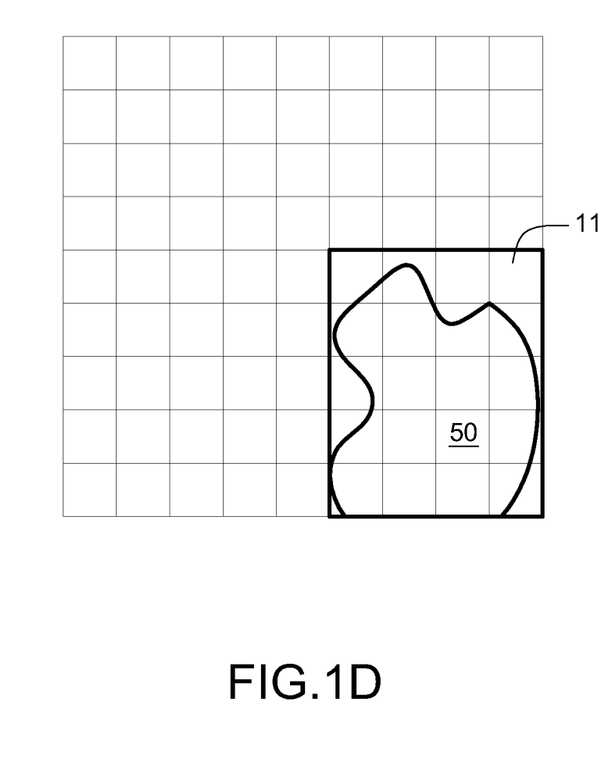
FIG. 1D is a schematic view of Step S36 of the object tracking method according to the present invention.
Figure 1E:
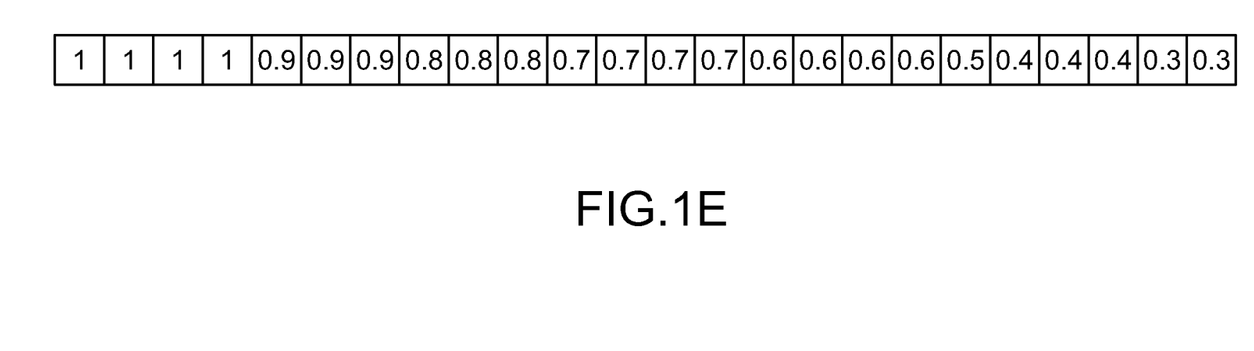
FIG. 1E is a schematic view of weight values of pixels within a first focus frame in FIG. 1A.

Referring to FIGS. 1A to 1E, FIGS. 1A to 1D are schematic views of illustrating implementation of an object tracking method according to the present invention in combination with an embodiment in a diagram manner. FIG. 1A is a schematic view of Step S30 of an object tracking method according to the present invention; FIG. 1B is a schematic view of Step S31 of an object tracking method according to the present invention; FIG. 1C is a schematic view of Steps S32 to S35 of the object tracking method according to the present invention; FIG. 1D is a schematic view of Step S36 of the object tracking method according to the present invention; FIG. 1E is a schematic view of weight values of pixels within a first focus frame in FIG. 1A.

In this embodiment, when a digital camera intends to shoot a dynamic object, in the present invention, firstly, an initial setting is performed on a picture captured by a lens, and a first focus frame 10 is set, so as to determine that an image enclosed by the first focus frame 10 is an object 50 to be tracked (FIG. 1A). The setting of the first focus frame 10 can be made through presetting a predetermined region, a user adjusts positions of the lens of the digital camera and the object, and the user adjusts an image of the object 50 on the lens into the predetermined region by observing a preview picture of the digital camera, and then completes the setting of the first focus frame 10 by pressing a shutter once or in other enabling manner.

Additionally, with the maturity of touch technologies, the setting of the first focus frame 10 can also be made by selecting a size of the first focus frame 10 with a frame directly in a user manual touch manner on the preview picture of the digital camera.

Referring to FIGS. 1A, 1E, and 3B, in this embodiment, the object 50 to be shot is an object in an irregular shape, the first focus frame 10 has 24 pixels therein, and the pixels respectively have the following weight values expressed in a group manner through the classification process respectively:

{1, 1, 1, 1, 0.9, 0.9, 0.9, 0.8, 0.8, 0.8, 0.7, 0.7, 0.7, 0.7, 0.6, 0.6, 0.6, 0.6, 0.5, 0.4, 0.4, 0.4, 0.3, 0.3}

Then, according to the classification process in Steps S301 to S303, a number of the first classifications can be adjusted according to demands of the user. In this embodiment, the number of the first classifications is 3 groups, and names of the first classifications are defined as a first classification A, a first classification B, and a first classification C respectively. The first classification A has a first weight value {1, 1, 1, 1}, the first classification B has a first weight value {0.9, 0.9, 0.9, 0.8, 0.8, 0.8, 0.7, 0.7, 0.7, 0.7}, and the first classification C has a first weight value {0.6, 0.6, 0.6, 0.6, 0.5, 0.4, 0.4, 0.4, 0.3, 0.3}.

However, for color distribution of the object 50 within the first focus frame 10, the first classification A has the largest first weight value, and pixels covered by the first classification A has the most apparent color features, so the defining the pixel range covered by the first classification A as the first rectangular frame 10A has a preferable effect for the tracking of the dynamic object.

After the setting of the first rectangular frame 10A is completed, referring to FIGS. 1C and 3A, a second rectangular frame 10B is set in the second frame picture, as described in Steps S311 and S312. After the setting of the second rectangular frame 10B is completed, that is, it is denoted that a displacement of the object 50 is successfully and dynamically detected in the present invention, then, according to a position of the second rectangular frame 10B (Step 32), a color feature is obtained for each of the pixels around the second rectangular frame 10B sequentially, and in the classification process manner, weight values of the color features of the pixels are calculated, multiple classifications are performed on the color features correspondingly, and weight values classified by the second rectangular frame 10B are defined as second classifications herein.

Then, after Step S32 is completed, in Steps S33 and S35, weight values of the second classification and the corresponding first classification are compared by calculating an approximation value and comparing the calculated approximation value with the threshold. When the approximation value is higher than the threshold, the second rectangular frame 10B is enlarged, and Steps S32 to S35 are executed repetitively until the approximation value is below the threshold. At this time, a size of the second rectangular frame 10B is a second focus frame 11 matching with the size of the object (as shown in FIG. 1D) in the second frame picture.

It should be noted that, the object tracking method according to the present invention can be applicable to tracking various objects in different shapes and sizes. Particularly, for an object in an irregular shape, the present invention automatically detects a shape of an object to be tracked in a color detection and weight concept manner rather than with an edge detection method necessarily, so both its complexity and computation demands are below those of the edge detection method.

Figure 2A:
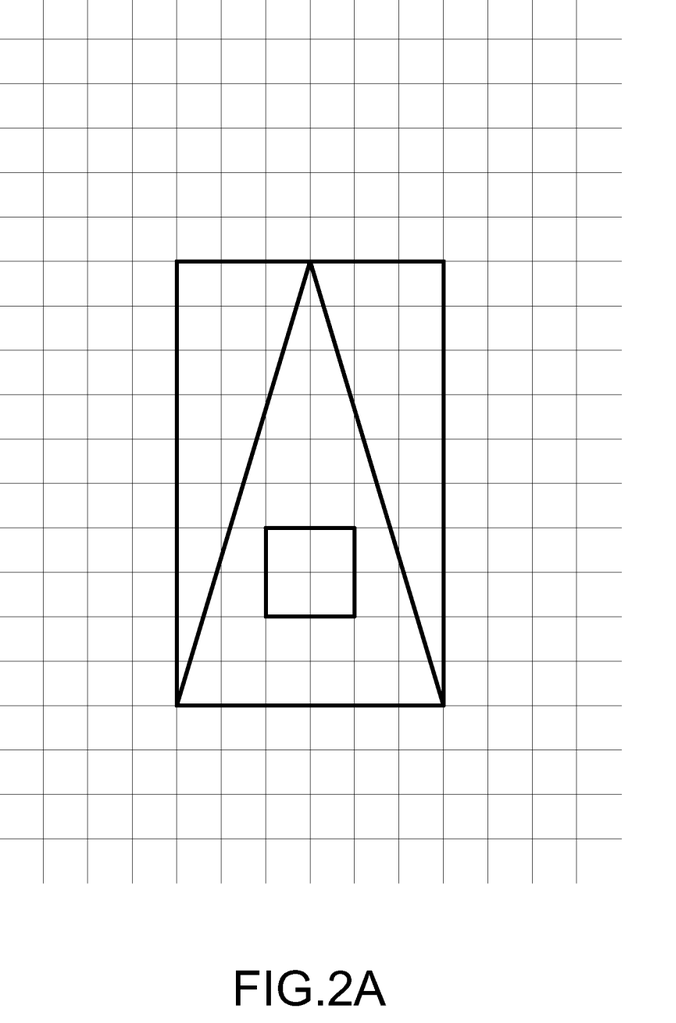
FIG. 2A is a schematic view of applying an embodiment of the present invention.
Figure 2B:
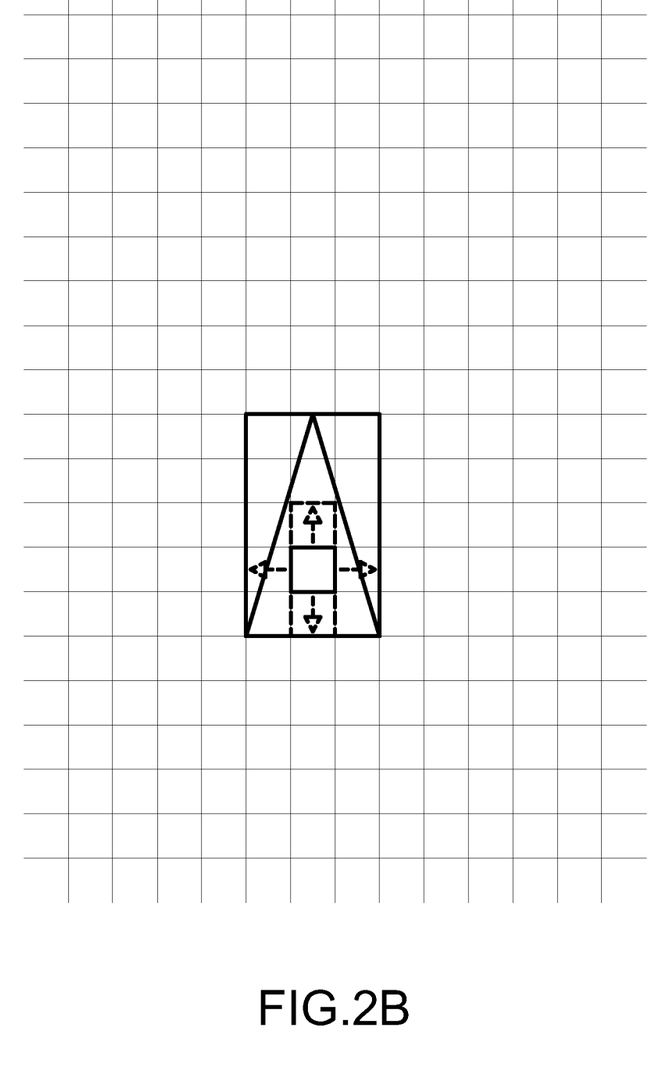
FIG. 2B is a schematic view of applying a second focus frame of the present invention when an object in FIG. 2A is downsized.
Figure 2C:
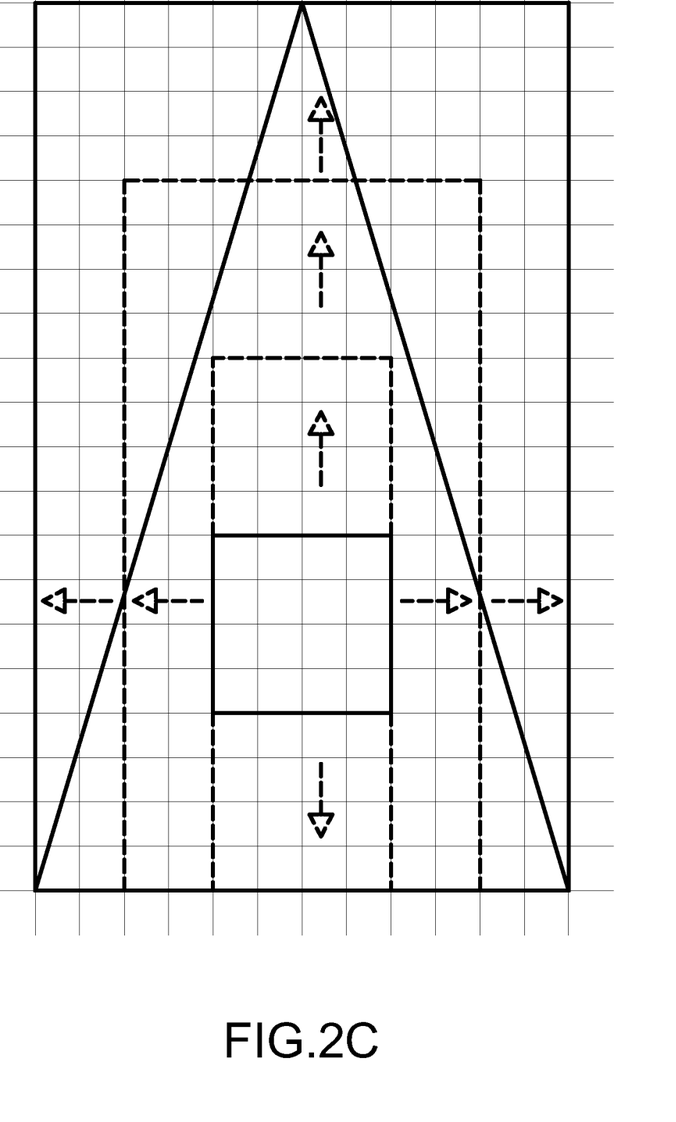
FIG. 2C is a schematic view of applying the second focus frame of the present invention when the object in FIG. 2A is enlarged.
Figure 2D:
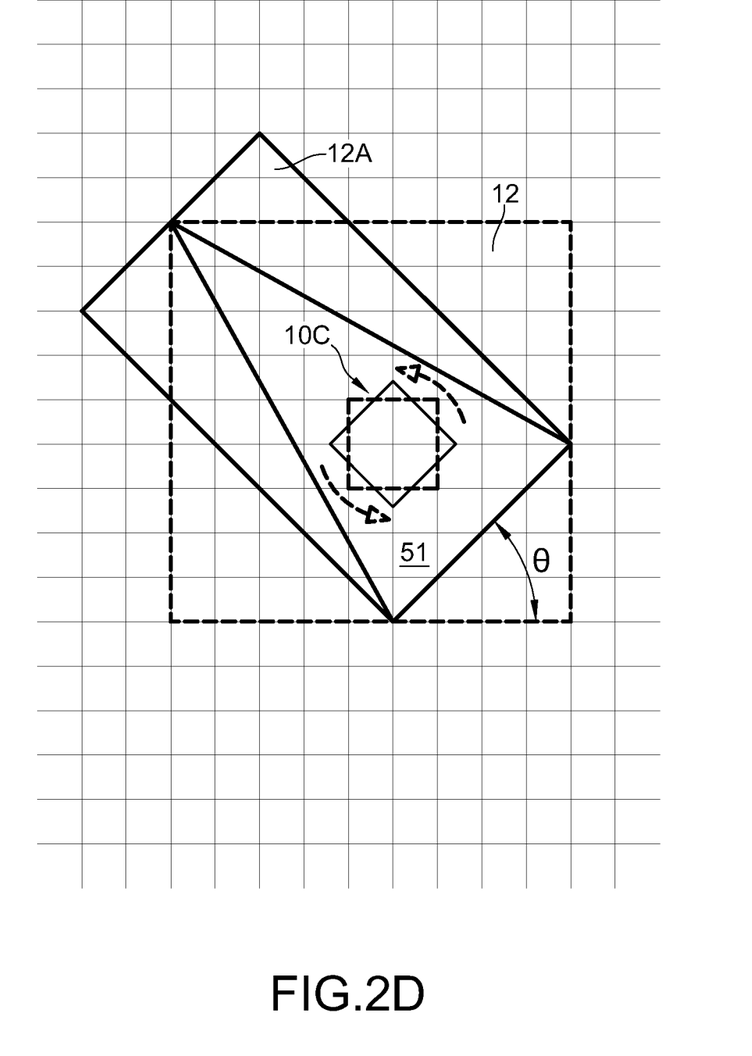
FIG. 2D is a schematic view of applying the second focus frame of the present invention when the object in FIG. 2A is rotated.

Referring to FIGS. 2A to 2D, and 3C, this specification further discloses three different implementation aspects, and the difference between FIG. 2A and the foregoing embodiment lies in that, an object in the drawing is one regular isosceles triangle. FIG. 2B is a schematic view of applying a second focus frame of the present invention when an object in FIG. 2A is downsized; FIG. 2C is a schematic view of applying the second focus frame of the present invention when the object in FIG. 2A is enlarged; FIG. 2D is a schematic view of applying the second focus frame of the present invention when the object in FIG. 2A is rotated (with an angle changed).

However, in order to achieve the second focus frame in FIGS. 2B and 2C, both the technical means and the method are the same as the foregoing steps when the object is downsized or enlarged, and thus are not recited herein. However, for FIG. 2D, if Steps S311 and S312 are directly used, a focusing range of the second focus frame 12 accommodates excessive image pixels out of the object 51, so that the fineness of the second focus frame 12 is reduced. Therefore, the positioning process in Step S31 needs to be improved, so as to be applicable to an object with an angle changed.

Figure 3D:
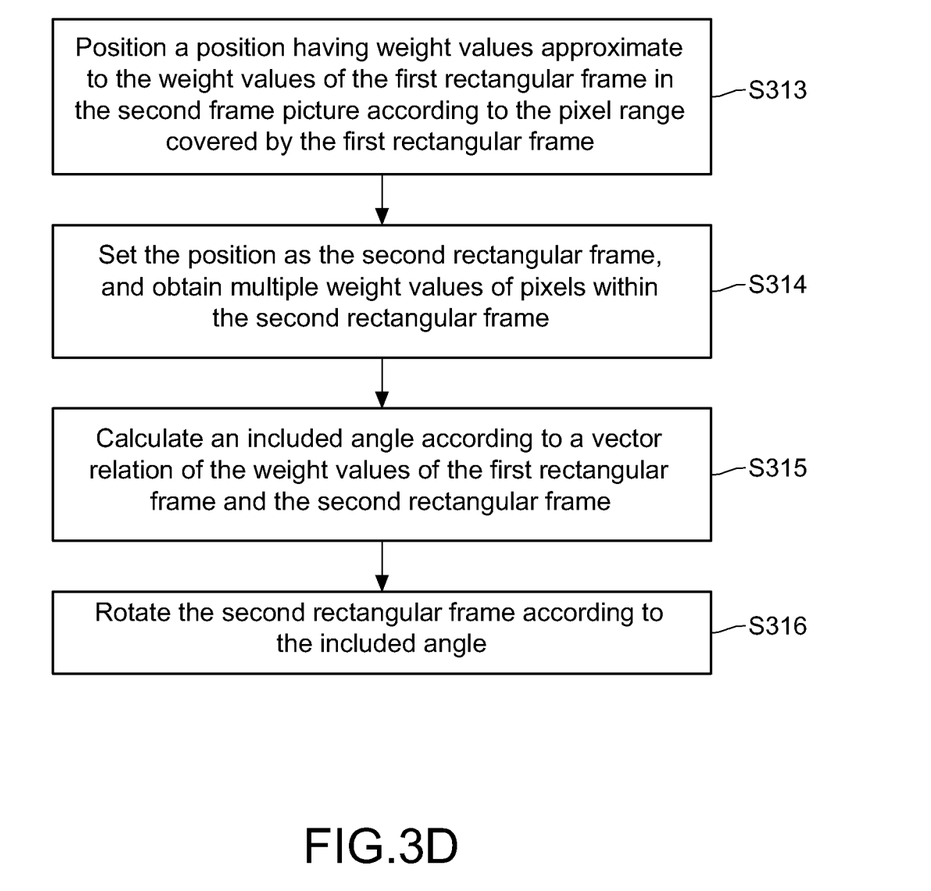
FIG. 3D is a flow chart of another positioning process according to the present invention.

Referring to FIG. 3D, FIG. 3D is a flow chart of another embodiment of the positioning process. The improved positioning process comprises the following steps.

In Step S313, a position having weight values approximate to the first rectangular frame is positioned in the second frame picture according to the pixel range covered by the first rectangular frame.

In Step S314, the position is set as the second rectangular frame, and multiple weight values of pixels within the second rectangular frame are obtained.

In Step S315, an included angle is calculated according to a vector relation of the weight values of the first rectangular frame and the second rectangular frame.

In Step S316, the second rectangular frame is rotated according to the included angle.

Therefore, through Steps S313 to S315, and by changing an angle θ of a second rectangular frame 10C in advance, the second focus frame 12A can be closer to the object 51, and the fineness of the focusing range of the second focus frame 12A is increased.

In view of the above, according to the present invention, in a color detection manner, firstly, color features of pixels within a focus frame are utilized, positioning is performed in successive pictures to track a displacement extent of an object, and regional classification is performed with weight values of pixels covered by the object to detect a shape, a size, and an angle of the object, so as to update information of the focus frame. In this way, adjusting the size of the focus frame in a dynamic manner can be helpful to a subsequent operation of focusing.

What is claimed is:

1. An object tracking method, comprising:
    performing a classification process in a first frame picture, so as to obtain multiple first classifications of pixels within a first focus frame, wherein the first focus frame has a first rectangular frame therein, and the classification process comprises:
        obtaining the color feature of each of the pixels within the first focus frame;
        calculating multiple weight values according to the color features respectively and correspondingly; and
        establishing the first classifications for the weight values from large to small, with the first rectangular frame being set in a pixel range covered by the first classification having the largest weight value among the weight values;
    performing a positioning process according to the first rectangular frame in a second frame picture, so as to obtain a second rectangular frame;
    obtaining a color feature of each of the pixels around the second rectangular frame sequentially, and establishing multiple second classifications according to the color features;
    calculating an approximation of the second classification and the corresponding first classification sequentially, so as to obtain an approximation value respectively;
    comparing each approximation value sequentially to determine whether the approximation value is larger than a predetermined threshold;
    if yes, progressively adjusting the second rectangular frame to a pixel range covered by the second classifications; and
    if no, stopping adjusting the second rectangular frame, so as to establish a second focus frame.

2. The object tracking method according to claim 1, wherein the positioning process comprises:
    searching a position having weight values approximate to the first rectangular frame in the second frame picture according to the pixel range covered by the first rectangular frame; and
    setting the position as the second rectangular frame.

3. The object tracking method according to claim 1, wherein the positioning process comprises:
    positioning a position having weight values approximate to the first rectangular frame in the second frame picture according to the pixel range covered by the first rectangular frame;
    setting the position as the second rectangular frame, and obtaining multiple weight values of pixels within the second rectangular frame;
    calculating an included angle according to a vector relation of the weight values of the first rectangular frame and the second rectangular frame; and rotating the second rectangular frame according to the included angle.

\* \* \* \* \*